United States Patent Office 3,620,045
Patented Nov. 16, 1971

3,620,045
SHAFT DISCONNECT-NONSHEAR TYPE
John L. Butterfield, Erie, Pa., assignor to
General Electric Company
Filed July 2, 1970, Ser. No. 51,980
Int. Cl. F16d 3/00
U.S. Cl. 64—28                                6 Claims

ABSTRACT OF THE DISCLOSURE

A nonresettable, disconnect arrangement is described which is particularly useful for disconnecting high speed generators such as those utilized in aircraft electrical systems. The disconnect coupling consists of two splined members which are respectively coupled to the generator and the driving source. These members include two circular flanged portions which are rigidly connected by a torque transmitting perforated ring. The perforated ring is surrounded by another ring which supports a number of inwardly extending cogs which project through the perforations in the torque transmitting line. A pair of disc brakes are selectively actuated to engage the cog carrying ring when disconnect is desired. When the brakes engage the ring, the ring and the cogs are held in a fixed position while the flange members and the perforated ring continue to rotate. The cogs act like teeth or shearing members and cut away the remaining metal between the perforations, severing the ring and disconnecting the generator from the driving source.

---

This invention relates to a disconnect device, and more particularly, to a device for disconnecting a driven device such as a generator from the driving source.

In aircraft applications, the electrical system for supplying the electrical needs of the vehicle customarily incorporates one or more generators which are either directly driven from the engine or through a speed reducing gear box. The generators are customarily operated at high speeds which often are in excess of 10,000 r.p.m. Occasionally, one or more of the generators must be disconnected from the driving source lest serious damage be done to the generators and the electrical system because of some malfunction which has already occurred or is about to occur. For example, the generator must be disconnected from the driving source if there is an actual or incipient bearing failure, excessive vibration, engine overspeed, excessive oil temperature, etc. Whenever any of these or other malfunctions occur, rapid disconnect of the generator from the driving source is required to avoid serious damage to the equipment and the system. Usually, sensors of various types are strategically distributed throughout the craft to sense the occurrence or incipient occurrence of these various conditions. The sensors generate a signal which produces an indication such as the lighting of a warning light, actuation of a buzzer or the like, on the pilot's instrument panel. When the warning device is energized to indicate the malfunction or incipient malfunction, the pilot actuates a disconnect mechanism which removes the generator from the driving source.

Hitherto, two basic types of disconnect devices have been available; devices which can be classified generally as resettable and non-resettable. The resettable devices are of the type in which the generator, once disconnected can be reconnected to the driving source without in any way disassembling or replacing components of the device. The non-resettable disconnects, on the other hand, usually involves rupturing, shearing, or fracturing of a connection between the driving source and the generator and therefore, requires disassembly and replacement of certain components before the generator can be placed on line again. Both types of disconnect devices, while useful in many applications and circumstances, are subject to a number of failings which limit their utility. The resettable devices can be complex and bulky in construction since not only must they provide for disconnecting of the generator, but they must also allow reconnection while the device still is rotating. Furthermore, the resettable devices require a substantial number of interacting components so that the reliability of the devices is often less than might be desired.

The non-resettable disconnects, on the other hand, while simple in construction, also have some shortcomings. Thus, one typical non-resettable device presently available involves the use of a cam and a spring restrained dog. The dog is released when the disconnect function is to be performed, and engages the cam. The torque exerted on the shaft when the cam is restrained by the dog, causes it to shear. Serious difficulties can arise in disconnects of this type when operating at high speeds; i.e. speeds in the order of 10–20,000 r.p.m. or more. At these rotational speeds, the kinetic energy of the rotating members is quite substantial. In order to absorb the kinetic energy without fracturing either the cam or the dog (an occurrence which could prevent disconnect since the fracture of these components will prevent shearing of the shaft) the kinetic energy has to be absorbed through deflection of the rotating parts. At these speeds and with these kinetic energies, the required deflection can in many instances, be excessive and raise significant problems. Furthermore, the problem of ensuring proper engagement between the dog and the cam can be quite severe and requires synchronization between the rotating members to provide proper engagement. That is, at 20,000 r.p.m. the cam rotates once every .003 second. In order to provide proper operation, the dog must be properly indexed so that upon release, it does not begin to move until the cam is in a specific angular position; otherwise, proper engagement will not occur. Consequently, proper indexing or synchronizing between the movement of the cam and dog is necessary and adds complexity to the arrangement. Consequently, a need exists for a simple, light weight, nonresettable disconnect mechanism which is capable of operating at high speeds and in which the disconect function is carried out rapidly, effectively, and at any angular position of the rotating members.

It is therefore a primary objective of this invention to provide a non-resettable, shaft disconnect arrangement, which is simple in construction, light in weight, and which operates efficiently and effectively at high rotational speeds.

Still another objective of the invention is to provide a non-resettable shaft disconnect arrangement operable at high speed in which the member which is ruptured to disconnect the shafts is inexpensive and may be easily replaced.

Other objectives and advantages of the invention will become apparent as the description thereof proceeds.

The various advantages and objectives of the invention may be carried out by providing a nonresettable disconnect mechanism between the driving and driven member which consists of a perforated ring which may be ruptured to disconnect the members with a minimum of applied force. The shaft disconnect arrangement consists of two flanged coupling members which are respectively connected to the driving and driven members through suitable splined end portions. The flanged members are placed in abutting relationship and connected by means of a torque transmitting perforated ring surrounding and attached to the outer periphery of the flanges. The perforated ring normally transmits torque between the two coupling members to transmit the driving force from the driving source to the generator. A ring shearing member which supports one or more inwardly extending cogs is mounted around the perforated ring with the cogs projecting through the perforations in the ring. This shearing member normally rotates together with the perforated ring. To disconnect the two coupling members, one or more brakes are actuated to clamp the shearing member and the cogs in a fixed position. Since the perforated ring continues to rotate, the dogs cut away the metal between the perforations, severing the ring and disconnects the generator from the driving source.

The novel features which are believed to be characteristic of this invention, are set forth with particularity in the appended claims. The invention itself, however, both as to its organization and method of operation, together with further objects and advantages thereof, may best be understood by reference to the following description taken in connection with the accompanying drawings in which:

Figure 1:
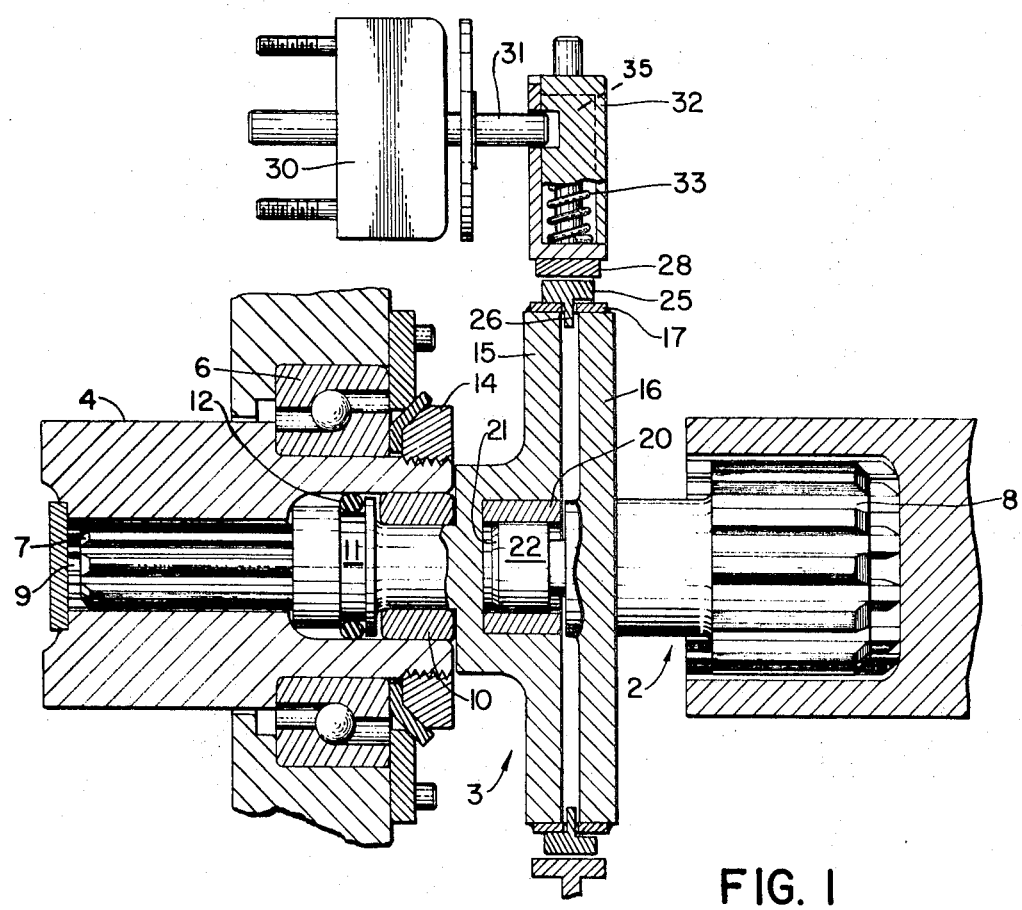
FIG. 1 is a vertical section taken through a disconnect device constructed in accordance with this invention.

As shown in FIG. 1, the disconnect device consists of two splined coupling members 2 and 3 connected respectively to the generator shaft 4 and a driving shaft, not shown. Generator shaft 4 is attached to the rotor of a generator, not shown, and is journaled in the bearings 6 supported on a generator housing, also not shown. Each of the coupling members 2 and 3 has splined ends 7 and 8 which engage the internal splines of the driving and driven shaft. Thus, splined end 7 of generator coupling member 2 engages the internal splines 9 of generator shaft counter bore 10. An O-ring channel 11 supports an O-ring 12 to provide a lubricant seal between coupling member 2 and the wall of the bore. C-ring 13 is also mounted on coupling member 2 and acts as a resilient retaining ring between the coupling member and the generator shaft. A locknut 14 is threaded on the end of shaft 4 and retains the bearings and shaft to prevent axial movement.

Disconnect coupling members 2 and 3 each have a circular flange 15 and 16, which are positioned adjacent to each other but in a spaced apart relationship. The two flanges are connected by a torque transmitting, severable member such as perforated ring 17 which is welded or otherwise fastened around the periphery of the flanges to transmit torque from the driving source to the generator. In disconnecting the generator from the driving source, torque transmitting ring 17 is, in a manner presently to be described, perforated to terminate transmission of torque to the generator. The two coupling members 2 and 3 are constructed so that they are free to rotate relative to each other after disconnect has been accomplished. To this end, a sleeve bearing 20 mounted in a counter bore 21 is provided in coupling members. A ground bearing surface 22 which forms part of the drive end coupling member 3 extends into the counter bore and is supported for rotation in bearing 20. The ground bearing surface 22 is free to rotate in the sleeve bearing once ring 17 is ruptured so that the two components are free to rotate relative to each other without transmitting torque, while at the same time, providing support for the components after disconnect has been accomplished.

Figure 2:
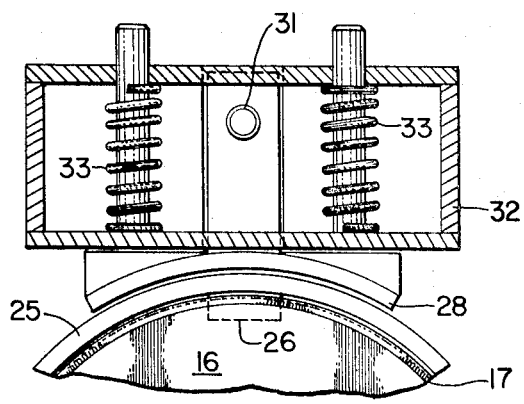
FIG. 2 is a section taken through the line 2—2 of FIG. 1.
Figure 3:
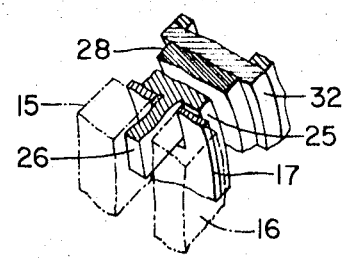
FIG. 3 is a partial perspective of the perforated ring and the cogs which form part of the assembly of FIG. 1.

Associated with the torque transmitting perforated ring is an arrangement for cutting or rupturing the metal between the perforations of the ring thereby to sever the rang and terminate torque transmission to the generator. hence, perforated ring 17 is surrounded by a ring 25 having a plurality of inwardly extending cogs 26 which project through the perforations in ring 17. As may be seen clearly in the perspective view of FIG. 2, cogs 26 are wedge shaped and extend loosely through perforations 27 of ring 17. Cog bearing ring 25 being coupled to ring 17 by means of the cogs 26 normally rotates with torque transmitting ring 17 and couplings 2 and 3. A pair of friction brake shoes 28 are positioned adjacent to ring 25 and selectively actuated to restrain rotation of ring 25 when the generator is to be disconnected. When ring 25 is restrained by the brake shoes 28, continuing rotation of the perforated ring 17 due to the driving torque from the driving source causes cogs 26 to act like shearing or sawing members, cutting away the metal between the ring perforation, severing the perforated ring thereby terminating transmission of torque from the driving source to the generator.

Brake shoes 28 which are selectively actuated to engage ring 25 and produce the disconnect function, are shaped to conform generally to the ring configuration and may be surfaced with friction material, not shown, to produce a rapid and effective braking action. The brake shoes are selectively actuated by means of a solenoid, shown generally at 30, to actuate a latching pin 31 which normally restrains the brake shoes. Brake shoes 28 are mounted in housing 32 which contains a plurality of compression coil springs 33 which normally urge the brake shoes which are mounted on a shaft 35 towards cog bearing ring 25. The latching pin 31, however, normally extends into an opening in brake supporting shaft 35 and retains the brake shoes out of contact with ring 25. Latching pin 31 is attached to armature 35 of solenoid 30 so that actuation of the solenoid and movement of the armature moves latching pin 31 out of contact with brake supporting shaft 35 which is then actuated by compression coil springs 33 to engage cog bearing ring 25. The brakes hold ring 25 and cogs 26 fixed thereby severing perforated ring 17 terminating torque transmission from the driving source to the generator.

The manner in which the disconnect of this invention functions to disconnect the generator from the driving source may best be understood by considering the following typical sequence. Under normal conditions, with no actual or incipient malfunction present, solenoid 30 is in the de-energized state and latching pin 31 is positioned to hold supporting shaft 35 against the spring pressure and maintains the brake shoes out of engagement with ring 25. Under these circumstances, disconnect coupling members 2 and 3 are physically connected by means of the perforated ring 17 so that they rotate together as a rigid structure and torque is transmitted from the driving source through coupling member 3, and ring 17 to the remaining coupling member and thence to the generator shaft 4. During this interval, the cog supporting ring 25 and the cogs 26 which project through the perforations in the ring are free to rotate with the coupling members and the torque transmitting ring. Consequently, as long as cog supporting ring 25 is not restrained in any way, it rotates freely with the disconnect coupling members and torque is transmitted between the driving source and the generator. Whenever some malfunction occurs or is about to occur so that one of the sensors produces an indication of the pilot's panel, the pilot initiates the disconnect sequence by actuating a circuit which energizes solenoid 30. When solenoid 30 is energized, it pulls armature 35 in thereby removing latch pin 31, which is mounted on the armature, out of contact with the brake shoe supporting shaft 35. Compression coil springs 33, therefore, force the brake shoes downwardly into engagement with ring 25. The force of the compression coils and the friction material which may be positioned on the surface of the brake shoes produce a frictional engagement between the brake shoes and the cog bearing ring 25, so that ring 25 and its associated cogs 26 are held fixed. Perforated ring 17 which is fastened to coupling members 2 and 3 continues to rotate by virtue of the torque applied thereto from coupling members 3 and the driving source. The sharp wedge-shaped cogs are now forced aaginst the metal portions between the perforations of the ring and rupture the metal between the perforations thereby severing the perforated ring 17 terminating transmission of torque between the flange disconnect members 2 and 3. With the termination of torque transmission to the generator 3, the generator is effectively disconnected from the driving source and the generator and the driving source are free to rotate relative to each other by virtue of the coupling between sleeve bearing 20 and the bearing surface 22. The generator attached to the disconnect coupling member 3 continues to rotate freely until all of the kinetic energy is dissipated, at which time, the generator comes to a stop. Once the generator is thus disconnected, it remains in this condition until disassembled and until a new coupling is provided. It will be obvious, that all that is required to place the system in operating condition again is to remove the separated portions of the perforated ring from the flanges of the respective coupling members and to reassemble the entire arrangement by mounting the cog supporting ring and cogs on a new perforated ring and fastening the rings by welding or in any other suitable manner to the flanges of the coupling members.

From the foregoing description, it can be readily appreciated that a nonresettable, disconnect mechanism for a generator, and particularly for a high speed aircraft generator, has been provided which is capable of disconnecting the generator from the driving source rapidly and efficiently at high speeds which characterize aircraft generators.

While a nonresettable disconnect mechanism has been described in what is presently considered to be a preferred embodiment of the invention, it will be apparent to those skilled in the art that various changes and modifications may be made in the structure and in the instrumentalities utilized without departing from the spirit and scope of the invention.

What I claim is new and desired to be secured by Letters Patent in the United States is:

1. A nonresettable disconnect device adapted to connect a driving and a driven member releasably, comprising,
    (a) a first coupling member having a splined end, adapted to be coupled to a driving member and a nonsplined end,
    (b) a second coupling member having a splined and a non-splined end, the splined end being adapted to be coupled to a driven member,
    (c) perforated, torque transmitting means rigidly secured to the non-splined ends of said first and second coupling members,
    (d) means for severing said perforated means to disconnect said coupling members, including,
        (1) cog means projecting through said perforated means for normally rotating therewith, and,
        (2) means to hold said cog means fixed when disconnect is desired whereby said cog means severs the rotating perforated means.

2. The disconnect device according to claim 1 wherein said perforated means comprises a ring having a plurality of perforations.

3. The disconnect device according to claim 2 wherein said coupling members have circular flanges at their non-splined ends and said ring surrounds and is rigidly fastened to said flanges.

4. The disconnect device according to claim 2 wherein said cog means includes a ring surrounding said perforated ring and supporting at least one inwardly extending cog projecting through a perforation.

5. The disconnect device according to claim 4 including brake means and selectively actuable holding means to retain said brake out of contact with said cog supporting ring.

6. The disconnect device according to claim 5 wherein said brake means is spring biased and said holding means retains said spring biased means out of contact whereby actuation of said holding means permits said spring biased brake to contact and hold said cog supporting ring fixed.

References Cited
UNITED STATES PATENTS

| | | | |
|---|---|---|---|
| 2,727,371 | 12/1955 | Troeger et al. | 64—28 |
| 3,427,826 | 2/1969 | Anderson | 64—28 X |

EDWARD G. FAVORS, Primary Examiner